United States Patent [19]

Reidies et al.

[11] Patent Number: 5,261,924
[45] Date of Patent: Nov. 16, 1993

[54] LAYERED CEMENTITOUS COMPOSITION WHICH TIME RELEASES PERMANGANATE ION

[75] Inventors: Arno H. Reidies, LaSalle; Edward S. Rogers, Princeton; Kenneth C. Scott, Ottawa, all of Ill.

[73] Assignee: Carus Corporation, Peru, Ill.

[21] Appl. No.: 772,430

[22] Filed: Oct. 7, 1991

Related U.S. Application Data

[63] Continuation-in-part of Ser. No. 386,411, Jul. 27, 1989, Pat. No. 5,152,804, and a continuation-in-part of Ser. No. 586,409, Sep. 21, 1990, abandoned, which is a continuation-in-part of Ser. No. 188,419, Apr. 29, 1988, Pat. No. 4,961,751.

[51] Int. Cl.⁵ .................................. D06L 3/00
[52] U.S. Cl. ................................. 8/107; 51/308; 51/308; 252/186.2; 252/186.25; 252/186.27; 252/186.43; 428/404
[58] Field of Search ............... 8/107, 158; 51/293, 51/307–309; 23/313, 313 AS; 252/95, 99, 90, 186.43, 186.2, 186.25, 186.27; 428/404

[56] References Cited

U.S. PATENT DOCUMENTS

| | | | |
|---|---|---|---|
| 2,219,660 | 10/1940 | Robson et al. | 264/144 |
| 2,657,182 | 10/1953 | Katz | 252/186.33 |
| 3,048,546 | 8/1962 | Lake et al. | 252/95 |
| 3,535,262 | 10/1970 | Hubbuch et al. | 252/186.33 |
| 3,582,376 | 6/1971 | Ames | 106/725 |
| 3,639,284 | 2/1972 | Long et al. | 252/99 |
| 3,660,068 | 5/1972 | Wilson | 71/34 |
| 3,924,037 | 12/1975 | Sullivan | 428/15 |
| 3,945,936 | 3/1976 | Lucas et al. | 252/95 |
| 4,023,955 | 5/1977 | Mueller | 71/64.11 |
| 4,040,850 | 8/1977 | Kyri et al. | 106/673 |
| 4,064,212 | 12/1977 | Kleeberg et al. | 264/117 |
| 4,070,300 | 1/1978 | Moroni et al. | 252/190 |
| 4,082,533 | 4/1978 | Wittenbrook et al. | 71/28 |
| 4,112,035 | 9/1978 | Lawrence et al. | 264/113 |
| 4,130,392 | 12/1978 | Diehl et al. | 8/101 |
| 4,218,220 | 8/1980 | Keppler et al. | 8/102 |
| 4,279,764 | 7/1981 | Brubaker | 252/99 |
| 4,349,493 | 9/1982 | Caseberg et al. | 264/37 |
| 4,391,723 | 7/1983 | Bacon et al. | 252/90 |
| 4,391,724 | 7/1983 | Bacon | 252/90 |
| 4,391,725 | 7/1983 | Bossu | 252/90 |
| 4,460,490 | 7/1984 | Barford et al. | 252/92 |
| 4,536,182 | 8/1985 | Tatin | 8/107 |
| 4,570,229 | 2/1986 | Breen et al. | 364/476 |
| 4,575,887 | 3/1986 | Viramontes | 8/158 |
| 4,601,845 | 7/1986 | Namnath | 252/99 |
| 4,655,953 | 4/1987 | Oakes | 252/99 |
| 4,657,784 | 4/1987 | Olson | 427/213 |
| 4,665,782 | 4/1987 | McCallion et al. | 8/111 |
| 4,670,037 | 6/1987 | Kistner | 71/1 |
| 4,711,748 | 12/1987 | Irwin et al. | 264/117 |
| 4,732,762 | 3/1988 | Sjorgren | 424/409 |
| 4,740,213 | 4/1988 | Ricci | 8/108.1 |
| 4,795,476 | 1/1989 | Bean et al. | 8/107 |
| 4,816,033 | 3/1989 | Hoffer et al. | 8/158 |
| 4,850,156 | 7/1989 | Bellaire | 51/293 |
| 4,919,842 | 4/1990 | Dickson et al. | 252/186.43 |
| 5,004,505 | 4/1991 | Alley et al. | 106/685 |

FOREIGN PATENT DOCUMENTS

| | | |
|---|---|---|
| 0238779A1 | 10/1986 | European Pat. Off. |
| 0275432A1 | 12/1987 | European Pat. Off. |
| 2311964 | 3/1973 | Fed. Rep. of Germany |
| 3636387 | 10/1986 | Fed. Rep. of Germany |
| 842224 | 9/1957 | United Kingdom |
| 2118463 | 4/1982 | United Kingdom |

OTHER PUBLICATIONS

Chemical Abstracts 114:209148w re Ocean Wash Appl'n. No. 360,982, Jun. 1, 1989 & International Application WO 15180.
Manufacturing Clothier, United Trade Press, "All Shook Up" London, Nov. 1986 pp. 27–31.
"Tableting" Chemical Engineering, Dec. 4, 1987, pp. 151–155.
"Agglomeration" Chemical Engineering, Oct. 1951, pp. 161–173.

Primary Examiner—R. Bruce Breneman
Attorney, Agent, or Firm—Fitch, Even, Tabin & Flannery

[57] ABSTRACT

A layered composition which includes a hardened core comprising at least about 50 weight percent permanganate which composition releases permanganate ion into an aqueous media over time is described. A method of making and using the composition of the invention also are described.

27 Claims, 2 Drawing Sheets

LAYERED CEMENTITIOUS COMPOSITION WHICH TIME RELEASES PERMANGANATE ION

This application is a continuation-in-part application of Ser. No. 386,411 filed Jul. 27, 1989, now U.S. Pat. No. 5,152,804, and Ser. No. 586,409, filed Sept. 21, 1990, now abandoned both of which are continuation-in-part applications of Ser. No. 188,419 now U.S. Pat. No. 4,961,751 to Eissele et al.

This application relates to a composition which includes a hardened permanganate core which comprises a water soluble permanganate salt embedded in a hardened hydratable cement or hardened binder/clay combination and Sorel cement, $Mg(OH)_2$ or gypsum cementitious outer layer overlying and completely surrounding the permanganate core. This application also relates to a method of making the composition of the invention and to a method for the time release of permanganate ion into an aqueous media utilizing the composition of the invention.

BACKGROUND OF THE INVENTION

Controlled or timed release is primarily a technique for the control of the rate of delivery of a chemical substance. Release of a chemical substance over time is widely used in connection with pharmaceuticals, pesticides, herbicides, and fertilizers and also in many other cases where a particular chemical agent must be administered on a periodic or sustained basis.

During the last several decades, many different technologies for the controlled release of chemical substances have been developed: encapsulation, entrapment, osmotic pumps, reservoirs, soluble glasses and erosible/degradable matrices. While suitable techniques for the time release of a great number of specific chemical agents (organic as well as inorganic) are available no practical, more generally applicable system is available for any of the permanganates, a family of strong oxidizing agents.

Water soluble salts of permanganic acid, such as $KMnO_4$, are sold for a great variety of uses: organic synthesis, organic solvent purification, water, waste water and air purification, metal surface treatment, the etching of plastics and numerous other applications. In many of these use areas, the permanganate must be added at a controlled rate to produce a predetermined concentration range which avoids underdosing and overdosing. The controlled addition is usually achieved by employing mechanical feeding devices for either the dry product or its aqueous solution. Mechanical feeding devices, however, require the availability of electric power at the point of use for the operation of feeders. This availability requirement can be a problem in certain environmental uses of permanganate such as odor ($H_2S$) abatement in sewer collection lines. In this and many other applications such as water treatment, it would be highly advantageous to have a suitably formulated product available that is designed to release permanganate ion at the required predetermined rate without the benefit of any mechanical/electric dosing equipment.

When addressing the problem of developing a controlled release permanganate, it becomes quickly apparent that the oxidative and corrosive properties of permanganate preclude the use of many of the materials customarily used in the preparation of time release formulations. Thus, for all practical purposes, practically all organics such as encapsulants, matrix materials or coatings are not useable, as are all oxidizable inorganics.

It is an object of this invention to provide a composition which releases permanganate ion at a controlled or timed rate in an aqueous media.

Another object of this invention is to make a layered cementitious composition which includes a concentration of permanganate at its core, but is substantially free of permanganate at its surface.

It is yet another object of this invention to provide a method for the controlled release of permanganate ion in an aqueous media.

These and other objects and advantages of the invention will be found by reference to the following description.

SUMMARY OF THE INVENTION

The layered composition of the invention comprises a hardened permanganate core which includes a water soluble permanganate salt embedded in a hardened hydratable cement or a hardened water glass or sodium aluminate and clay combination. An outer layer or skin which is selected from the group consisting of $Mg(OH)_2$ and a hydratable cement overlies the hardened permanganate core, the cementitious outer layer selected from the group consisting of Sorel cement or gypsum cement wherein the core and cementitious outer layer combinations are selected from the group consisting of Sorel cement outer layer with a Portland cementitious core, a Sorel cement outer layer with a clay/binder core and a Sorel cement outer layer with a gypsum core, a gypsum cementitious outer layer with a Portland cementitious core, a gypsum cementitious outer layer with a Sorel cement core, a gypsum outer layer with a gypsum core and a gypsum cementitious outer layer with a core of clay/binder, the binder selected from the group consisting of sodium aluminate and water glass. Hardened $Mg(OH)_2$ may be used to cover and coat the hydratable cementitious cores or the clay/binder cores. The outer layer is substantially free of permanganate ion, having not more than about 0.001 g/cc permanganate ion and not having a thickness greater than from about 2 mm and preferably having a thickness of about 0.1 mm to about 2 mm. The core may have as much permanganate as will be compatible with the cement or water glass/clay or sodium aluminate/clay composition of the core, the core having at least about 50 weight percent permanganate salt to over 90 weight percent permanganate salt for cores which are highly tolerant of the permanganate salt such as Sorel cement. In an aqueous media the $Mg(OH)_2$ or Sorel cement outer layer or gypsum outer layer dissolves or permits water to travel through it to the core in an amount which is effective to permit water to reach the core and the permanganate therein, dissolve the permanganate salt and release permanganate ion over time into the aqueous media. Because of efflorescence associated with cement other than Sorel cement, a portion of the permanganate salt is concentrated in the surface portion of the core which permits dissolution of the permanganate ion from the surface of the core for the release of permanganate ion over time in the aqueous media. Thereafter, more permanganate embedded in the core is exposed to water, dissolved and removed from the core which process continues until substantially all of the permanganate salt has been dissolved and removed from the core over time. With Sorel cement there is no efflorescence and there is no permanganate salt at the surface of the core, however, a Sorel cement core is slightly soluble in water and permits the dissolution of the $MgCl_2$ or $MgSO_4$ in the cement and dissolution of the permanganate salt embedded in it.

Another aspect of the invention is the method of making the controlled release product of the invention. The method includes mixing the core cement or water glass/clay or sodium aluminate/clay with a water soluble permanganate salt and water, the mixture having at least about 4 weight percent water, the permanganate salt comprising at least about 50 weight percent, based upon the weight of the salt, cement or binder/clay combination. Thereafter the mixture is formed and hardened into a non-flowable core material. Thereafter the non-flowable core is coated with $Mg(OH)_2$, Sorel cement or gypsum to provide an outer layer or skin around the core material. This provides the layered composition of the invention which provides for the controlled release of permanganate ion in an aqueous media.

Another aspect of the invention provides a method for the controlled release of permanganate in an aqueous media. The method includes mixing the composition of the invention into an aqueous media.

DESCRIPTION OF THE PREFERRED EMBODIMENTS

Figure 1:
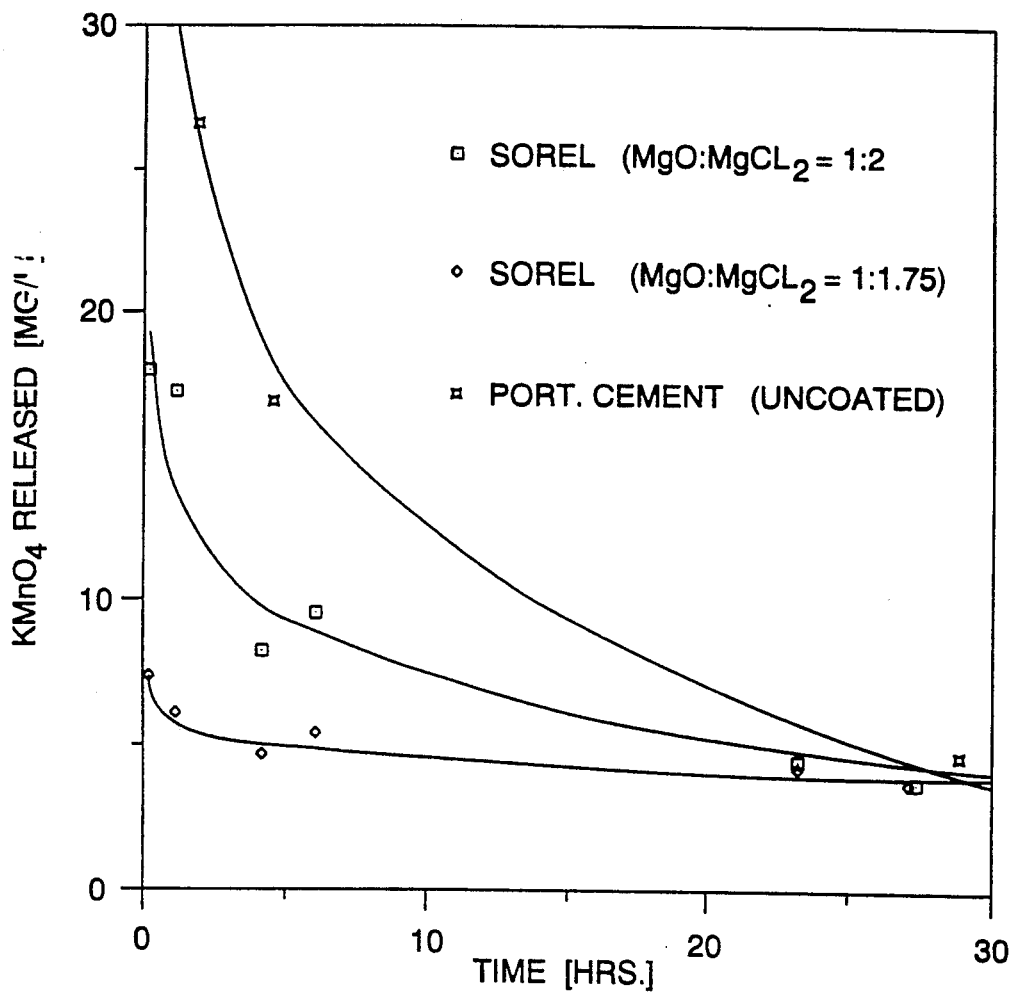
FIG. 1 is a graph which shows the effect of Sorel cement coatings over a Portland cement core.

The invention includes a layered cementitious composition which comprises a hardened permanganate core surrounded by a $Mg(OH)_2$ or hydrated Sorel cement or hydrated gypsum cement outer layer or skin. The hardened permanganate core comprises small crystals of a water soluble permanganate salt embedded in a hardened hydrated cement or hardened clay and binder combination, the binder selected from the group consisting of water glass and sodium aluminate. The invention also includes a method of making the layered cementitious composition and a method for the release of permanganate ion in water using the layered cementitious composition of the invention.

As used herein, "hydrated Sorel cement" for a core means a hydrated combination of $MgCl_2$ and MgO, $MgSO_4$ and MgO or $MgCl_2$, $MgSO_4$ and MgO. In the invention after hydration, the $MgCl_2$ or $MgSO_4$ are present in a ratio of at least about 1 mole $MgCl_2$ or $MgSO_4$ for about every 30 moles MgO (1:1.3 to 1:13 as a weight ratio) and preferably at least about 1 mole $MgCl_2$ or $MgSO_4$ for about 3.6 to about 8.3 moles MgO (1:1.5 to 1:3.5 as a weight ratio). Sorel cement can include a combination of $MgCl_2$, $MgSO_4$ and MgO with the $MgSO_4$ being at least partially interchangeable with $MgCl_2$. For outer layer coatings the molar ratio of $MgCl_2$ or $MgSO_4$ to MgO in Sorel cement broadly is about 1:1 to about 1:10 (or 1:0.42 to 1:4.2 weight ratio) and preferably is about 1:4 to about 1:6 (1:1.7 to 1:2.5 weight ratio).

"Water soluble permanganate salt" means permanganate salts having a water solubility in water at 25° C. of at least about 55 g/L. Particularly common water soluble permanganate salts include $KMnO_4$ and $NaMnO_4$.

"Molded product" means a product which is formed in molds without any substantial external pressure to form the product.

"Water glass" means sodium or potassium silicates with $Na_2O$ (or $K_2O$) to $SiO_2$ molar ratios from about 1:1 to about 3.3 and preferably from about 1:2.5 to about 3.3, respectively. These silicates include but are not limited to $Na_2SiO_3$, $Na_4Si_2O_4$ and $Na_6Si_2O_7$ with varying amounts of water of hydration.

"Sodium aluminate" means aluminum sodium oxide $AlNaO_2$.

"Clay" means natural mineral mixtures based upon silica and alumina such as bentonite and attapulgite clay.

"Portland cement" means a mixture of limestone silica and clays which is calcined and then mixed with gypsum. White Portland cement is preferred because of its low iron content.

"Calcined gypsum" means $CaSO_4.\frac{1}{2}H_2O$ and $CaSO_4$ in the form of Keene's cement which when combined with water, hydrates and forms hydrated gypsum or gypsum cement.

"Binder" means sodium or potassium water glass or sodium aluminate.

"Hydratable cement" means self-curing cements which cure with water of hydration such as Sorel cement, Portland Cement, Pozzolan cement and Calcium aluminate cement.

"Magnesium oxide" or "MgO" as used herein means MgO of the "light burned" variety and will harden with the addition of water to $Mg(OH)_2$. Magnesium oxide which can be used in the invention is commercially available as MagChem®30 from Martin-Marietta Company. The reactivity of the MgO, that is the rate at which it hardens into $Mg(OH)_2$, is affected by various commercial grades of MgO.

The composition of the invention is a layered cementitious composition which includes a hardened permanganate core surrounded by hydrated Sorel cement or gypsum cement or $Mg(OH)_2$. The core includes a water soluble permanganate salt embedded in a hardened hydratable cement or a hardened binder/clay combination. The outer layer of the composition is substantially free of water soluble permanganate salt. "Substantially free of soluble permanganate salt" means that not more than about 0.001 g/cc of water soluble permanganate salt is present in the outer layer. The hardened permanganate core includes hydrated cement or the hardened binder/clay combination and the water soluble permanganate salt such that the product as a whole (including the outer layer) comprises from about 30 to about 90 weight percent water soluble permanganate salt.

The cement or $Mg(OH)_2$ outer layer is thin ranging between about 0.1 to about 2 mm and comprises from about 0.5 to about 2.5 weight percent of the composition including outer layer and core and is very slightly soluble in water or permits water to permeate through it to the hardened permanganate core. This solubility is only slight compared to other inorganic compounds which are considered water soluble. The solubility or permeability of the outer layer, however, is sufficiently significant that when the composition of the invention is put into an aqueous media, there is dissolution of the outer layer to permit the water to go through the outer layer, water dissolves the permanganate salt in the core and releases the permanganate ion into the water. Studies have shown that hydrated Sorel cement loses 14.5 percent of its weight when kept in running water at about room temperature for one day (Japanese Application 79/100,362, Aug. 6, 1979) and 29.5% of its weight when kept in running water at about room temperature for 28 days. (Japanese Application 80/21,255, Feb. 21, 1980). This dissolution and permeability is important to the release of the permanganate ion into the aqueous media over time. In the case where the outer layer is Sorel cement, the Sorel cement has about 1 part MgO to about 1.1 to about 10 parts 28% $MgCl_2$ solution, preferably about 1 part MgO to about 1.5 to about 2 parts 28% $MgCl_2$ solution.

While not intending to be bound by any theory, it is believed when the composition of the invention is put into or immersed into water, the water permeates through the outer layer, dissolves the permanganate salt at the surface of the core, which in turn exposes more permanganate salt in the core for solvation by the water and release of permanganate ion. The mechanism is believed to differ between the materials used. In the case of a Sorel cement outer layer the water removes or dissolves the $MgCl_2$ or $MgSO_4$ from the hydrated Sorel cement composition. This removal destroys the $MgCl_2$ or $MgSO_4/MgO$ composition which had been combined into a hydrated cement. The removal or dissolution of the $MgCl_2$ and/or $MgSO_4$ from the hydrated Sorel cement while the product is in water eventually exposes the water soluble permanganate salt in the core to water for dissolution and release of permanganate ion as described. Except for Sorel cement, other hydratable cements and the binder clay combination effloresce or permit the relative movement of permanganate salt and cement during curing such that there is a slightly higher concentration of permanganate salt at the surface of the core than at the center of the core.

In the case of Portland cement there does not appear to be dissolution of the matrix in an aqueous media and permanganate is the only component that is dissolved and then removed or leached with Portland cement. The leaching process is aided by some porosity of the matrix. Water is believed to enter the pellet through existing pores. When gypsum cement is used in the invention, the $CaSO_4.2H_2O$ slowly dissolves "in total" without splitting into any components. The permanganate, however, dissolves at a faster rate than the hydrated gypsum. When clay/binder cores are used, it is believed that it is a partially cured water glass binder that is removed or is leached out and the left-behind clay particles have no structural stability. It is believed that both the permanganate and binder go into solution, but it is believed the dissolution of the permanganate salt is the rate determining step.

As a result of differing mechanisms the product of the invention results in different forms near the point when the core has been exhausted of permanganate salt. In the case of Sorel cement, the product does not lose its dimensional integrity, but assumes a very light, spongy structure consisting of $Mg(OH)_2$. This "empty shell" still has remarkable mechanical stability Portland cement is not porous or permeable by iteself, but the presence of permanganate salt and dissolution thereof permits water to enter into the core. Near the point of complete removal or exhaustion of permanganate salt from the core, the Portland cementitious core is a very porous "empty shell" of Portland cement. Near the point of complete removal of permanganate salt from the gypsum cementitious core, the empty matrix gradually softens and eventually collapses to form a mush of gypsum because of hydraulic instability of $CaSO_4.2H_2O$. In the case of the clay/binder core, near the point of complete removal of permanganate salt, the empty matrix will collapse to form a shapeless mushy clay residue.

As a result of efflorescence, there may be a somewhat higher concentration of permanganate ion released from the composition of the invention as water - dissolves the permanganate salt at the core. Hence, the composition of the invention, permits a higher initial release rate of permanganate ion, this release rate quickly levels out and permits a relatively constant release of permanganate ion over a time period such as hours, days or weeks.

Further, it has been found that the rate of release and dissolution of the Sorel may be controlled by the amount of $MgCl_2$ or $MgSO_4$ used in making the hydrated Sorel cement. Tests of uncoated Sorel cement pellets subjected to static leaching with water showed that removal or leaching of permanganate increased by increasing the relative amounts of $MgCl_2$ to MgO. This is shown in Table I.

TABLE I

| % $KMnO_4$ Content | $MgCl_2$:MgO | % of Total $KMnO_4$ Released at Hrs. | | |
|---|---|---|---|---|
| | | 1 hr. | 5 hrs. | 30 hrs. |
| 58.1 | 1:7.2 | 5.6 | 13.7 | 37.1 |
| 60.0 | 1:2.9 | 12.9 | 34.4 | 74.8 |
| 39.2 | 1:7.2 | 2.8 | 9.4 | 35.6 |
| 40.0 | 1:2.9 | 13.9 | 39.3 | 83.0 |
| 20.0 | 1:7.2 | 1.6 | 10.6 | 40.2 |
| 20.0 | 1:2.9 | 19.1 | 45.4 | 86.8 |

As seen in FIG. 1, varying the ratio of $MgCl_2$ to MgO affects the release of permanganate ion from Portland cementitious cores coated with Sorel cement. As shown in FIG. 1 where the ratio of $MgO:MgCl_2$ is 1:2 the release rate of permanganate is faster than where the ratio of $MgO:MgCl_2$ is 1:1.75.

Data showing release rates under static conditions (as opposed to dynamic) from coated and uncoated clay/water glass pellets with 80% $KMnO_4$ are shown below in Table II. Different coating materials (Sorel cement, magnesium oxide, calcium sulfate) were used. The release rates are expressed as percent of the total permanganate present in the pellet.

TABLE II

| Coating | % $KMnO_4$ Released in One Hour | % $KMnO_4$ Released in Six Hours |
|---|---|---|
| None | 16.5 | 54.4 |
| Sodium Water Glass | 13.8 | 40.3 |
| Sorel Cement | 1 | 5.5 |
| $CaSO_4.2H_2O$ | 1.4 | 6.7 |
| MgO | 1.2 | 9.9 |

An important aspect of the invention includes the outer layer-core combinations which are compatible with one another and the extent which certain core materials are compatible with permanganate ion. In this aspect of the invention a hydrated Sorel cement outer layer is used to surround a hydrated Portland cementitious core, a clay/binder core and a hydrated gypsum cement core. Hydrated gypsum cement is used to surround a binder-clay, hydrated Portland cement, a hydrated gypsum and a hydrated Sorel cement core with the binder clay and Portland cementitious core being preferred as adhering better to the hydrated gypsum outer layer. $Mg(OH)_2$ coatings may be used to coat all of the aforedescribed cementitious cores but are particularly useful with clay/binder cores. The composition of the invention when used for the controlled release of permanganate ion in an aqueous media should have at least about 50 weight percent permanganate salt based upon the weight of the core at preferably at least about 80 weight percent permanganate salt. In this connection the ranges for the following cores are

| Clay/binder/KMnO$_4$ | | |
| --- | --- | --- |
| % KMnO$_4$ | % binder | % clay |
| Broad 20–90 | 5–20 | 5–60 |
| Preferred 60–80 | 10–20 | 10–20 |

| Portland cement/KMnO$_4$ | | |
| --- | --- | --- |
| % KMnO$_4$ | % Portland Cement | % water |
| Broad 30–90 | 10–70 | Enough to make extrudable or moldable paste |
| Preferred 60–80 | 20–40 | |

| Sorel cement (magnesium oxychloride or oxysulfate cement) | |
| --- | --- |
| % KMnO$_4$ | % Cement paste* |
| Broad 30–90 | 10–70 |
| Preferred 60–80 | 20–40 |

| Gypsum cement/KMnO$_4$ | |
| --- | --- |
| % KMnO$_4$ | % Paste (gypsum & water) |
| Broad 30–70 | 30–70 |
| Preferred 45–65 | 35–55 |

*1 weight part MgO + 1.3 to 3 weight parts 28% MgCl$_2$ solution.

Further, when the core is a binder/clay combination, the ratio of binder to clay is in the range of from about 1:0.5 to about 1:2.

The controlled release of permanganate ion from the composition of the invention differs from the bleaching action described in U.S. Pat. No. 4,961,751 to Eissele et al. in that the bleaching action of the method described in that patent is a mechanical action of abrasion between hardened products combined with additional mechanical action of touching the garments with the cementitious/permanganate product to randomly bleach the garments. In contrast, the time release of permanganate ion from the composition of the invention as described herein is based upon water moving through the outer layer of the composition, dissolution of the water soluble permanganate salt, movement of the dissolved permanganate ion through a residue of the outer layer after the action of the water on the outer layer without any mechanical action or abrasion on the cured cementitious composition.

The core may be made by molding, extrusion disk pelletization or briquetting the permanganate salt with the hydratable cement. In this aspect of the invention, the unhydrated cement or the binder/clay combination, the permanganate salt and water are mixed to form a formable mass.

In a clay-binder formulation, (not based on hydration) the water is added only to make the mixture extrudable—most or all of it is driven off in the curing step at 110° C. The water added might be in the order of 4–10% of the total weight.

This is somewhat different for hydratable cements, at least part of the water is needed for hydration. However, the actual amount of water actually used also depends on the chosen method of agglomeration. With molding it is not as critical, as long as the paste is pourable. With extrusion, it is very critical, as H$_2$O-content strongly influences the viscosity. In disk pelletization, the amount of water used depends on the desired rate of pellet growth.

Very generally the amount of water actually used ranges from about 80% to about 600% of the stoichiometric amount needed to effect complete hydration of the quantity of cementitious material present.

Table III indicates the stoichiometric quantities needed.

TABLE III

| Hydratable Cement | Stoichiometric H$_2$O [p/p] |
| --- | --- |
| Portland | 3 parts cement:1 part H$_2$O |
| Gypsum (hemihydrate) | 1 part gypsum:0.2 p. H$_2$O |
| Keene's (anhydrous) | 1 part Keene's:0.26 p. H$_2$O |
| Sorel (MgCl$_2$.3MgO.11H$_2$O) | 1 part (MgCl$_2$ + 3MgO): 0.92 p. H$_2$O |

Filler/binder cores may be made by preweighing amounts of the permanganate salt and of the clay (filler) which are then well mixed to form a homogeneous blend. A measured quantity of water glass (binder) is then diluted with a predetermined weight of water and the mixture combined with the earlier prepared dry-mix while applying high shear, high intensity agitation. The resulting dough can be extruded or molded into pellets of desired size and geometrical shape.

The pellets are then cured, preferably for about 2 hours at 110° C.

Portland cement cores may be made by preweighing amounts of the permanganate salt and White Portland cement and mixing thoroughly to form a homogeneous blend. A predetermined amount of water is added to the above dry mix with efficient agitation. The resulting paste can be extruded or molded into pellets of desired size and geometrical shape. Curing is at room temperature.

Gypsum cores may be made by the same general procedure applied as described for Portland cement. Good mixing is here even more critical than with Portland cement.

After mixing the formable mass is formed by extrusion, molding or briquetting. During that process the curing of the core with the permanganate salt starts, but may continue after the process such as extrusion. Curing the cement includes hardening it by hydation. Curing generally is complete when the core hardens into a non-flowable mass which has a shear strength of at least about 15 pounds and preferably from about 15 to about 25 pounds.

After the core cures and hardens it is coated with the outer layer of gypsum cement or Sorel cement. Coating may be done by dip coating, spray coating, fluidized bed coating or pan coating. The cement used to coat is mixed with sufficient water effective for permitting the coating process such as from about 50 to about 66 weight percent Sorel cement and from about 34 to about 66 weight water or from about 45 to about 65 weight percent calcined gypsum and from about 35 to about 55 weight percent water, or from about 40 to about 55 weight percent magnesium oxide and from about 45 to about 60 weight percent water for dip coating.

A variety of coating methods can be used such as spraying, tumbling, dipping, as well as combinations of these methods. Dipping and a combination of dipping or spraying with tumbling are preferred.

For dipping, thin slurries of the coating agents in water, falling within the following ranges:

| Coating Materials | Weight % Solid Content (Range) | Weight % Water Content (Range) |
|---|---|---|
| Sorel | 50–66 | 34–50 |
| $CaSO_4 \cdot \frac{1}{2} H_2O$ (gypsum) | 45–65 | 35–55 |
| MgO | 40–55 | 45–60 |

In case of the Sorel cement, the magnesium chloride (or sulfate) is added to the water first, followed by the magnesium oxide, while providing effective agitation throughout the mixing process.

The gypsum and magnesia slurries are made by adding the dry materials to the water while stirring vigorously. The coating process then consists of simply dipping the cured pellets into the slurry. Heavier coatings can be produced by multiple dippings. Depending on the thickness of the coating, curing times of several hours to overnight must be provided.

A preferred procedure for Sorel cement coatings is as follows.

The pellets are first dipped into 28% magnesium chloride solution for a few minutes and then "dusted" with MgO-powder (for example in a tilted, rotating dish). The result is a coating of Sorel cement on the pellet, (actually formed in situ), which can still be enhanced by a final spray with $MgCl_2$-solution.

The size and shape of the layered composition has significance with regard to release rate and the useful life of the products to be designed for specific applications. With some simplification, the shape and the distribution of permanganate salt in the core of the product will conform to the shape of the overall product and it is believed that in the compositions of the invention with high permanganate content (>80% permanganate salt), the release rate is approximately proportional to the surface area of permanganate salt which is exposed to water.

Given a particular formulation of the composition, the release rate (i.e. the quantity of permanganate salt dissolved per unit time) is largely controlled by surface area of permanganate salt crystals exposed to water. As this surface area of the core containing permanganate changes due to the permanganate being dissolved from the core with the permanganate surface area becoming correspondingly smaller by dissolution, the release rate of permanganate ion into the aqueous media also becomes correspondingly smaller. Surface area is, however, closely related to the size and geometry of the pellet.

A composition of the invention of a given weight has the least surface area when it is shaped into a sphere. As the diameter increases, the surface area per unit weight of composition decreases, with a corresponding decline in the relative rate of release. Thus, if a spherical product is to have substantial longevity in actual use, its core diameter will be relatively large. How large will primarily depend on the desired longevity as well as the intended rate of release, which latter is at least partially controlled by the dissolution characteristics of the molded product. Moreover, if a pellet or sphere cannot release the require quantities of permanganate per unit time, additional molded spheres or pellets will have to be used.

For the composition of the invention a spherical shape is an important aspect of the invention because (a) the spherical shape minimizes exposed surface area (and consequently the release rate) and this factor can be used in designing a product release over time for time delayed and for control of a permanganate;
(b) the release rate from a spherical product should be much more predictable than from any other configuration; and
(c) the production of spherical products should be attainable by spheronization (tumbling) of uncured extrudates.

The layered composition of the invention provides an ideal method of releasing permanganate ion in an aqueous media without the intervention of mechanical or electrical metering devices. According to the method, the cured molded product is mixed or immersed into the aqueous media, the cement outer layer is dissolved or permeated with water over time, the permanganate salt in the core is dissolved and permanganate ion is released into the aqueous media through the outer layer over time. Moreover, the rate of release may be changed by changing the size and shape of the product and/or in the case of a Sorel cement outer layer increasing the amount of $MgCl_2$ or $MgSO_2$ relative to MgO to increase the release rate.

The following examples set forth exemplary ways of making the compositions according to the invention.

EXAMPLE 1

Portland cement pellets containing 60.8% $KMnO_4$ were prepared by dry mixing the $KMnO_4$ with the Portland cement. To this mixture sufficient water is added to produce a moldable paste. The paste is placed in plastic molds and allowed to cure. The pellets obtained weighed about 9.4 grams, had a 0.5 inch diameter and 1.5 inch length. After curing, some pellets were dip-coated in a mixture of magnesium oxide (5 parts by weight) with a 28% solution f magnesium chloride (10 parts by weight). This material was designated "pellet #1". Another portion of the Portland cement-based $KMnO_4$-pellet was dip coated in a mixture of the same materials, but present in a different proportion: magnesium oxide (5 parts by weight) plus 28% solution of magnesium chloride (8.7 parts by weight). This material was designated "pellet #2". After the coatings had hardened, the pellets were placed (separately) into the extraction tube with a total volume of 618L distilled water recycled through the tube. A water flow of 200/ml/min was passed through the extractor for 28 hours and the permanganate concentration in the effluent monitored analytically. An uncoated Portland cement pellet was also extracted under the same conditions for the same length of time.

At the termination of the extraction, the following percentages of the $KMnO_4$ originally present in each pellet type had been released:
uncoated pellet: 66.7%
Pellet #1: 36.4%
Pellet #2: 22.9%

As can be seen from the extraction curves shown in FIG. 1, it is not only the overall permanganate release rate that can be controlled by the use of coatings of different permeability, such coatings will also affect the shape of the extraction curve, making the release more uniform.

EXAMPLE 2

Filler/binder type pellets containing 75% $KMnO_4$ (after curing) were prepared as follows.

Forty pounds of technical grade potassium permanganate as dry-blended with four pounds of bentonite clay. To the above mixture, nine pounds of Type E water glass (Philadelphia Quartz) diluted with 1.7 pounds of water was added with intensive agitation to produce a dough-like paste which was extruded into cylindrical pellets of 0.5" diameter and 1.5" length. The partially cured pellets were baked in an oven for about 2 hours at a temperature of approximately 110° C. The finished product was hard and had a shear strength of 20 pounds.

A portion of the pellets was then dip-coated in an aqueous suspension of unhydrated Sorel cement (36% water) and allowed to cure overnight.

Coated and uncoated pellets were then put individually into extraction tubes and leached with tap water at flow rates of 200 mL/min. Over a 24 hour period, the concentrations of $KMnO_4$ measured at the effluent side of the extraction tube were as follows:

| Time (hrs.) | Flow Through | mg/L $KMnO_4$ Coated | mg/L $KMnO_4$ Uncoated |
|---|---|---|---|
| .083 | 1L | 18.0 | 90.5 |
| 0.5 | 6L | 18.7 | 69.2 |
| 1.0 | 12L | 15.6 | 66.7 |
| 2.0 | 24L | 10.9 | 64.7 |
| 3.5 | 42L | 9.8 | 56.9 |
| 4.5 | 54L | 7.8 | 52.3 |
| 5.5 | 66L | 5.1 | 47.0 |
| 22.0 | 264L | 2.0 | 14.9 |
| 23.0 | 276L | 2.0 | 4.5 |

Figure 2:
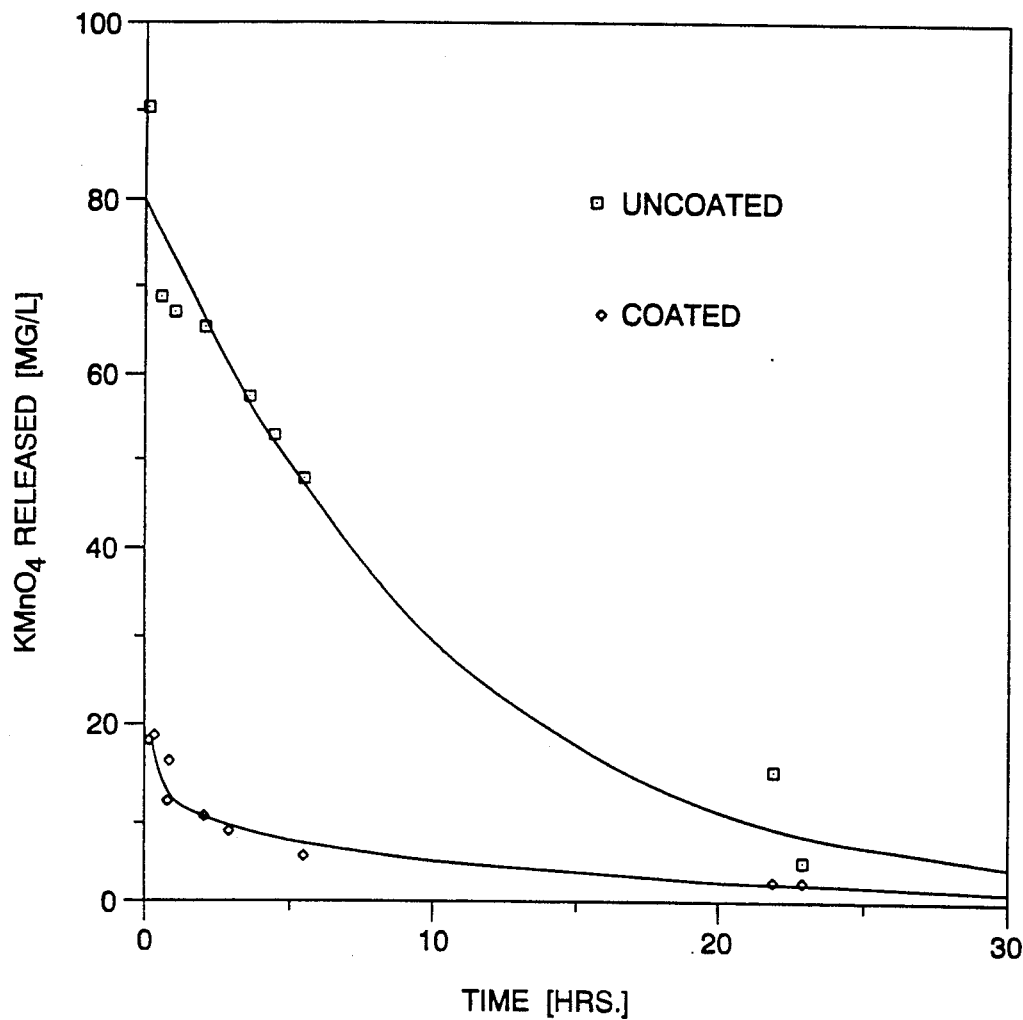
FIG. 2 is a graph which shows the effect of Sorel cement coatings over a clay/binder core of sodium water glass/bentonite clay.

The above data are also graphically depicted in FIG. 2. When comparing the performance of the coated pellet with that of the uncoated, it is evident that the Sorel cement coating not only effectively attenuates the release of $KMnO_4$ from a filler/binder type pellet but also causes the release rate to be more even with time (after as relatively brief initial surge period).

The potential uses for a method and product which controls the release permanganate ion in an aqueous media are many. For drinking water, the method and composition of the invention may be used to destroy or discourage growth of taste and odor producing or filter clogging algae in water reservoirs, and water purification plant operations in general; to discourage growth of nuisance mollusks (Zebra Mussels, corbicula) in pipelines and on equipment surfaces; to eliminate waterborne parasites such as giardia; to treat water for taste and odor and ion and manganese; and to disinfect water, using either straight permanganate or formulations of permanganate with, for example, copper ion and silver ion. For municipal waste water, the method and composition of the invention may be used to control odors ($H_2S$, mercaptans, sulfides); to prevent corrosion; and to enhance dewatering. For industrial waste water, the method and composition of the invention may be used to control odors (such as occur in meat and vegetable packing, fermentation operations and tanneries); to destroy toxics (such as —CN and phenols); to remove color (such as in dye manufacture, dying operations, chemical operations, pulp and paper); to control COD, BOD; and to destroy organic chelants in order to make heavy metal ions precipitable (in electroless plating waste). For swimming pool water, the method and composition of the invention may be used to purify swimming pool water in a filter-equipped side stream. For water run offs, the method and composition of the invention may be used to purify pesticide-containing agricultural run offs; and to treat mining run offs (coal, minerals). In fish farming, the method and composition of the invention may be used to control DO, algae and parasites. In miscellaneous water use, such as cooling towers, the method and composition of the invention may be used to readjust redox potential (ORP); to prevent systems from becoming anaerobic, or in corrosion protection of metal parts or to optimize conditions for disinfection, i.e., to discourage biological growth. For air and gas purification, the method and composition of the invention may be used to replenish $KMnO_4$ in scrubbing operations with recirculated scrubbing liquor; and to supply $KMnO_4$ in once-through scrubbing systems. For metal cleaning such as descaling and de-smutting, the method and composition of the invention may be used to replenish $KMnO_4$ as it is consumed. For organic oxidations, the method and composition of the invention may be used to control the rate of the oxidation reaction, including for the prevention of run-away reactions; and in solvent purifications, to replenish the $KMnO_4$ at about the rate it is consumed.

Although the invention has been described with regard to its preferred embodiments, it should be understood that various changes and modifications as would be obvious to one having the ordinary skill in this art may be made without departing from the scope of the invention which is set forth in the claims appended hereto.

The various features of this invention which are believed new are set forth in the following claims.

What is claimed is:

1. A layered product comprising
   a hardened non-flowable permanganate core and an outer layer selected from the group consisting of a permeable hydrated cement which will adhere to the core and hardened $Mg(OH)_2$,
   the hardened core comprising at least about 50 weight percent water soluble permanganate salt and a core matrix selected from the group consisting of a hardened binder/clay combination or a hydrated cement.

2. A layered product as recited in claim 1 wherein the core matrix is selected from the group consisting of the binder/clay combination, hydrated Portland cement and hydrated gypsum and the outer layer comprises hydrated Sorel cement; or the product has a core matrix selected from the group consisting of hydrated Sorel cement, hydrated Portland cement, hydrated gypsum and a hardened binder/clay combination and the outer layer comprises hydrated gypsum.

3. A layered product as recited in claim 1 wherein the outer layer comprises hydrated Sorel cement and the core matrix comprises hydrated Portland cement.

4. A layered product as recited in claim 1 wherein the outer layer comprises hydrated gypsum and the core matrix comprises hydrated gypsum or the hardened binder/clay combination.

5. A layered product as recited in claim 1 wherein the outer layer is hardened $Mg(OH)_2$.

6. A layered product as recited in claim 2 wherein the outer layer is hydrated gypsum and the core matrix is hydrated Sorel cement and wherein the hydrated Sorel cement core matrix comprises $MgCl_2$ and $MgO$, the $MgCl_2$ being present in a ratio of at least about one mole $MgCl_2$ for about every 30 moles of $MgO$.

7. A layered product as recited in claim 6 wherein the MgCl$_2$ is present in a ratio of at least about one mole MgCl$_2$ for about every 3.6 to about 8.3 moles of MgO.

8. A layered cementitious product as recited in claim 2 wherein the outer layer is hydrated gypsum and the core matrix is hydrated Sorel cement and wherein the core matrix is hydrated Sorel cement and wherein the hydrated Sorel cement comprises MgSO$_4$ and MgO, the MgSO$_4$ being present in a ratio of at least about one mole MgSO$_4$ for about every 30 moles of MgO.

9. A layered cementitious product as recited in claim 8 wherein the MgSO$_4$ is present in a ratio of at least about one mole MgSO$_4$ for about every 3.6 to about 8.3 moles of MgO.

10. A method of controlling the release of permanganate ion into an aqueous media, the method comprising:
mixing a layered cementitious product and an aqueous media, the layered product comprising
a hardened permanganate core and an outer layer selected from the group consisting of hardened Mg(OH)$_2$, hydrated Sorel cement and hydrated gypsum;
the hardened core comprising at least about 50 weight percent water soluble permanganate salt and a core matrix comprising a hardened binder/clay combination or a hydrated cement selected from the group consisting of hydrated gypsum, hydrated Portland cement and hydrated Sorel cement; the cementitious product having the outer layer comprising hydrated Sorel cement and the core matrix comprising the hardened binder/clay combination or the hydrated cement selected from the group consisting of hydrated Portland cement, and hydrated gypsum; or the cementitious product having the outer layer comprising hydrated gypsum and the core matrix comprising the hardened binder/clay combination or the hydrated cement selected from the group consisting of hydrated Sorel cement, hydrated gypsum and hydrated Portland cement; or the cementitious product having an outer layer comprising hardened Mg(OH)$_2$ and the core matrix comprising the hardened binder/clay combination or the hydrated cement selected from the group consisting of hydrated Sorel cement, hydrated Portland cement and hydrated gypsum.

11. A method of controlling the release of permanganate ion into an aqueous media as recited in claim 10 wherein the outer layer comprises hydrated Sorel cement and the hardened core matrix comprises hydrated Portland cement.

12. A method of controlling the release of permanganate ion as recited in claim 10 wherein the outer layer comprises hydrated gypsum.

13. A method of controlling the release of permanganate ion as recited in claim 10 wherein the outer layer comprises hydrated gypsum and the core matrix comprises the hardened binder/clay combination or hydrated Portland cement.

14. A method of controlling the release of permanganate ion as recited in claim 10 wherein the outer layer comprises hardened Mg(OH)$_2$.

15. A method of making a layered permanganate product, the method comprising:
mixing a core material selected from the group consisting of a hydratable core cement or binder/clay combination, a water soluble permanganate salt and water to form a moldable mixture comprising at least about 50 weight percent water soluble permanganate salt based upon the weight of core material,
curing the core material in molds to provide a hardened non-flowable core material,
coating the core material with a hydratable cement outer layer selected from the group consisting of Sorel cement, gypsum, and MgO and
hydrating the outer layer to provide a layered permanganate product.

16. A method of making a layered cementitious permanganate product as recited in claim 15 wherein the hydratable cement outer layer is Sorel cement which comprises MgCl$_2$ and MgO, the MgCl$_2$ being present in a ratio of at least about one mole MgCl$_2$ for about every 10 moles MgO.

17. A method of making a layered cementitious permanganate product as recited in claim 15 wherein the hydratable cement outer layer is Sorel cement which comprises MgSO$_4$ and MgO, the MgSO$_4$ being present in a ratio of at least about one mole MgSO$_4$ for about every 10 moles MgO.

18. A method of making a layered cementitious permanganate product as recited in claim 16 wherein the MgCl$_2$ is present in a ratio of at least about one mole MgCl$_2$ for about every 4 to about 6 moles of MgO.

19. A method of making a layered cementitious permanganate product as recited in claim 17 wherein the MgSO$_4$ is present in a ratio of at least about one mole MgSO$_4$ for about every 4 to about 6 moles of MgO.

20. A method of making a layered permanganate product as recited in claim 15 wherein the core material is selected from the group consisting of Sorel cement, Portland cement and the binder/clay combination and the outer layer comprises gypsum cement.

21. A method of making a layered cementitious permanganate product as recited in claim 15 wherein the core material comprises Portland cement and the outer layer comprises Sorel cement.

22. A method of making a layered cementitious permanganate product as recited in claims 15, 16, 17, 18, 19, 20 or 21 Wherein the core material is coated with the hydratable cement by dip coating the core material with the hydratable cement.

23. A layered product as recited in claim 1 wherein the outer layer is hardened Mg(OH)$_2$ and the core matrix is selected from the group consisting of hydrated Sorel cement, hydrated Portland cement, hydrated gypsum, and hardened binder/clay combination.

24. A layered product as recited in claims 1, 2, 5 or 23 wherein the outer layer comprises from about 0.5 to about 2.5 weight percent of the product.

25. A layered product as recited in claims 1, 2, 3, 4, 5, 6, 7, 8, 9 or 23 wherein the outer layer is substantially free of a water soluble permanganate salt.

26. A method for controlling the release of permanganate ion as recited in claims 10, 11, 12, 13 or 14 wherein the outer layer is substantially free of a water soluble permanganate salt and the outer layer comprises from about 0.5 to about 2.5 weight percent of the layered product.

27. A method of making a layered permanganate product as recited in claims 15, 16, 17, 18, 19, 20 or 21 wherein the outer layer is substantially free of a water soluble permanganate salt and the outer layer comprises from about 0.5 to about 2.5 weight percent of the layered product.

* * * * *